March 15, 1966  P. KERIOS ETAL  3,240,958
DOUBLER CIRCUIT
Filed Oct. 14, 1963
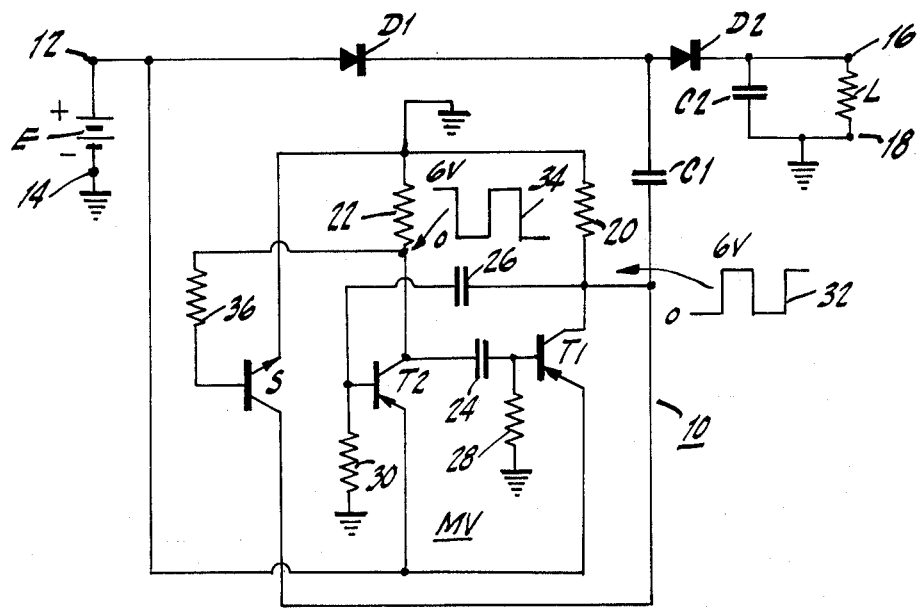
INVENTORS
PAN KERIOS &
ANTHONY TROIANO
BY
Morris A. Rabkin
Attorney United States Patent Office 3,240,958
Patented Mar. 15, 1966

3,240,958
DOUBLER CIRCUIT
Pan Kerios, Clearwater, Fla., and Anthony Troiano, Raritan, N.J., assignors to Radio Corporation of America, a corporation of Delaware
Filed Oct. 14, 1963, Ser. No. 315,794
8 Claims. (Cl. 307—110)

This invention relates generally to circuits for converting a relatively low unidirectional input voltage into a relatively higher unidirectional output voltage, and more particularly to a novel doubler circuit for doubling an input voltage. The doubler circuit of the present invention is particularly useful for doubling the voltage of a battery.

It is sometimes desirable to double the available voltage from a source of voltage in a vehicle, such as an automobile or an airplane, for example, in order to operate equipment that requires an input voltage double that of the available voltage. Some automobiles are provided with 6-volt electrical systems, for example, while others have 12-volt electrical systems. If one wishes to operate a radio that requires a 12-volt input in an automobile that is provided with a 6-volt system, means must be provided to double the automobile's battery voltage before it can be applied to the (12-volt) radio. It has been proposed to use converter circuits employing transformers to convert the relatively low voltage from a low voltage source to a relatively higher voltage. Transformers, however, are bulky and fairly expensive. Some prior art converter circuits also employ transistors whose breakdown voltages must be greater than two times the input voltage, a rating voltage that is double that necessary for transistors in the circuit of the present invention.

It is an object of the present invention to provide a novel doubler circuit that does not employ a transformer. It is another object of the present invention to provide a novel doubler circuit that employs transistors whose breakdown voltage ratings are determined by the relatively low input voltage, rather than double that voltage.

Another object of the present invention is to provide a novel doubler circuit that is relatively simple in construction and operation, easy to manufacture, and highly efficient in use.

Briefly stated, the novel doubler circuit of the present invention comprises an oscillator circuit, such as a free-running multivibrator circuit, and switching means connected so as to charge a capacitor from a source of input voltage during one portion of each cycle of operation of the multivibrator, and to connect the capacitor in series with the input voltage source and across another capacitor to charge the latter to substantially twice the voltage of the input source during the remaining portion of each cycle of operation. Thus a voltage having a value twice that of the input voltage becomes available for application to a load. Unidirectional means are provided to prevent the capacitors from discharging through the source of input voltage.

The novel features of the present invention, both as to its organization and method of operation, as well as additional objects and advantages thereof, will be more readily understood from the following description, when read in connection with the accompanying drawing, the single figure of which is a schematic diagram of a novel doubler circuit in accordance with the present invention.

Referring, now, to the drawing, there is shown a novel doubler circuit 10 for converting the input voltage from a unidirectional source of voltage, such as a battery E, connected between a pair of input terminals 12 and 14, to a substantially doubled output voltage for a load L, connected between a pair of output terminals 16 and 18. The load L is represented schematically as a resistor, but it may be any utilization device requiring an operating voltage of substantially twice that available directly from the battery E. The positive terminal of the battery E is connected to the input terminal 12, and the negative terminal of the battery E is connected to the input terminal 14, the latter terminal being connected to a common connection, such as ground.

Means are provided to chop the voltage of the battery E and to provide two square-wave outputs that are 180° out of phase with each other. To this end, an oscillator having two out-of-phase outputs, such as a multivibrator circuit MV comprising two PNP transistors T1 and T2, is provided. The emitters of the transistors T1 and T2 are connected to each other and to the input terminal 12. The collectors of the transistors T1 and T2 are connected to the input terminal 14 through load resistors 20 and 22, respectively. The base of the transistor T1 is cross-coupled to the collector of the transistor T2 through a capacitor 24, and the base of the transistor T2 is cross-coupled to the collector of the transistor T1 through a capacitor 26. The bases of the transistors T1 and T2 are connected to ground through biasing resistors 28 and 30, respectively, the latter resistors being relatively much larger than the load resistors 20 and 22.

In operation, the multivibrator circuit MV functions to provide, at the collectors of the transistors T1 and T2, two square-wave outputs 32 and 34, respectively, that are out of phase with each other. The amplitude of each of these square waves is substantially that of the voltage of the battery E. Thus, if the battey E is a 6-volt battery, a square-wave output is provided at each of the collectors of the transistors T1 and T2 whose amplitude is substantially 6 volts, as shown, for example, by the waveforms 32 and 34. While it is desirable for the positive-going and negative-going waves in each cycle of the square waves 32 and 34 to be of substantially equal duration, the doubler circuit 10 will also function when the waves in each cycle are unequal in duration, as will be explained hereinafter.

The multivibrator MV is a conventional multivibrator wherein the transistors T1 and T2 conduct alternately. Let it be assumed, for example, that current flows first through the transistor, T2, and that the transistor T1 is cut off. Current will increase through the transistor T2 until it saturates. During this time, the transistor T1 is held in a cut-off condition by the positive-going voltage applied to the base of the transistor T1 from the collector of the transistor T2 through the capacitor 24. The capacitor 26, which was previously charged, now begins to discharge through the resistors 20 and 30. Thus, the voltage drop across the resistor 30 increases, tending to cut the transistor T2 off. At the same time, the cross-coupled voltage applied to the base of the transistor T1 through capactior 24 tends to decrease (go negative). This action increases until the transistor T2 is cut off and the transistor T1 becomes saturated. The capacitor 24 then discharges through the resistors 22 and 28 until the voltage across the resistor 28 biases the transistor T1 to cut-off. The transistor T2 then becomes conductive again, and the cycle of operation is repeated.

Means comprising a diode D1 are provided to connect, during substantially one-half of each cycle of operation of the multivibrator MV, a capacitor C1 across the battery E to charge it to substantially the voltage of the battery E. Means comprising a diode D2 are also provided to connect, during the remainder of each cycle of operation of the multivibrator MV, the charged capacitor C1 in series circuit with the battery E to charge a capacitor C2 to substantially twice the voltage of the battery E. To this end, one side of the capacitor C1 is connected to the input terminal 12 through a unidirectional device, such as a diode D1, which is poled in a direction to permit current to flow easily from the battery E to the capacitor C1. The other side of the capacitor C1 is connected to the collector of the transistor T1 and to the collector of an NPN transistor S, with a base of opposite conductivity type to those of the pair of transistors connected in the multivibrator circuit. The emitter of the transistor S is connected to the common connection, ground, and the base of the transistor S is connected to the collector of the transistor T2 through a resistor 36.

One side of the capacitor C2 is connected to one side of the capacitor C1 through a diode D2, and the other side of the capacitor C2 is connected to the common connection, ground. The diode D2 is poled in a direction to permit current to flow only from the one side of capacitor C1 to the one side of the capacitor C2. The output terminal 16 is connected to the one side of the capacitor C2, and the output terminal 18 is connected to the common terminal, ground.

The transistor S is gated "on" and "off" by the square-wave output from the collector of the transistor T2 and functions as switching means to connect one side of the capacitor C1 periodically to ground, whereby to charge the capacitor C1 to the voltage of the battery E during one-half of the cycle of operation of the multivibrator MV. During the other half of each cycle of operation of the multivibrator MV, the conduction of the transistor T1 functions to connect the charged capacitor C1 in series with the battery E, the diode D2 and the capacitor C2, whereby to charge the capacitor C2 to twice the voltage of that of the battery E, as will be explained hereinafter in detail. The duration of the positive-going and negative-going waves in each cycle of the square waves 32 and 34 need not be equal, as long as they are of sufficient duration to afford adequate charging of the capacitors C1 and C2.

In operation, the battery E causes the transistors T1 and T2 of the multivibrator MV to conduct alternately and to provide, at their collectors, substantially similar square waves 32 and 34 that are out of phase with each other, as illustrated in the drawing. During one portion (about one-half cycle) of each cycle of operation, when the transistor T2 is conducting, the base of the switching transistor S is biased positively, and the transistor S is caused to conduct. When the switching transistor S is conducting, the voltage between its emitter and its collector is substantially zero, so that the capacitor C1 is connected in parallel with the battery E, whereby it may be charged to substantially the full voltage of the battery E through the diode D1. Because of the diode D1, current can flow only from the battery E to the capacitor C1 and not in a reverse direction. The transistor S is gated "on" and "off" in synchronism with the conduction and non-conduction, respectively, of the tansistor T2.

During the remaining portion (about one-half cycle) of each cycle of operation, the transistors T2 and S are cut off and the transistor T1 is conductive. Under these conditions, the charged capacitor C1 is connected in series with the battery E through the emitter-collector path of the transistor T1, the voltage across the latter emitter-collector path now being substantially zero. During this half of the cycle of operation, the series circuit, comprising a path from the positive terminal of the battery, through the emitter-collector path of the transistor T1, the charged capacitor C1, the diode D2 and the capacitor C2, and then to ground, is completed, whereby the capacitor C2 is charged to the combined voltage of that across the caapcitor C1 and across the battery E, that is, to substantially twice the voltage of the battery E. The diode D2 prevents the capacitor C2 from discharging through either the capacitor C1 or the battery E when the diode D1 is conducting, whereby the full voltage across the capacitor C2 is applied across the load L.

From the foregoing description, it will be apparent that there has been provided an improved doubler circuit by means of which an input voltage is doubled without employing a transformer or transistors whose breakdown voltages are determined by two times the input voltage, rather than the input voltage only. While only a single embodiment of the invention has been described herein, variations in its circuit arrangement and application, all coming within the spirit of this invention, will no doubt, readily suggest themselves to those skilled in the art. Hence, it is desired that the foregoing shall be considered as illustrative and not in a limiting sense.

What is claimed is:
1. A voltage doubler circuit comprising
   (a) a pair of input terminals for applying a source of voltage therebetween,
   (b) a pair of output terminals for deriving an output voltage therebetween,
   (c) a first capacitor,
   (d) an oscillator circuit having an input and two outputs,
   (e) means connecting said input of said oscillator circuit to said input terminals for energizing said oscillator circuit, said oscillator circuit providing, when energized, periodic output signals at said two outputs, respectively, that are out of phase with each other,
   (f) first unidirectional conducting means,
   (g) means connecting said first unidirectional conducting means and said first capacitor in series between one of said input terminals and one of said outputs of said oscillator circuit,
   (h) a switching transistor having an emitter-collector path and a base,
   (i) means connecting the other of said two outputs of said oscillator circuit to said base of said switching transistor,
   (j) means connecting said emitter-collector path of said switching transistor between said first capacitor and the other of said input terminals,
   (k) a second capacitor,
   (l) second unidirectional conducting means,
   (m) means connecting said first and said second unidirectional conducting means and said second capacitor in series between said input terminals, and
   (n) means connecting said output terminals to opposite sides, respectively, of said second capacitor.
2. A voltage doubler circuit comprising
   (a) a pair of input terminals for applying a source of voltage therebetween,
   (b) a pair of output terminals for deriving an output voltage therebetween,
   (c) a first capacitor,
   (d) an oscillator circuit having an input and two outputs,
   (e) means connecting said input of said oscillator circuit to said input terminals for energizing said oscillator circuit, said oscillator circuit providing, when energized, periodic output signals at said two outputs, respectively, that are out of phase with each other,
   (f) a first diode,
   (g) means connecting said first diode and said first capacitor in series between one of said input terminals and one of said outputs of said oscillator circuit, said first diode being poled so that current may flow to said first capacitor,
   (h) a switching transistor having an emitter-collector path and a base,
   (i) means connecting the other of said two outputs of said oscillator circuit to said base of said switching transistor to gate said transistor "on" and "off" periodically by one of said output signals,
   (j) means connecting said emitter-collector path of said switching transistor between said first capacitor and the other of said input terminals,
   (k) a second capacitor,
   (l) a second diode,
   (m) means connecting said first and said second diodes and said second capacitor in series between said input terminals, said second diode being poled so that current may flow from said first capacitor to said second capacitor, and (n) means connecting said output terminals to opposite sides, respectively, of said second capacitor.

3. A voltage doubler circuit comprising
(a) a free-running multivibrator circuit having a pair of input terminals for receiving a source of operating voltage therebetween and a pair of transistors each having a base, an emitter, and a collector, said pair of transistors of said multivibrator circuit being connected to conduct alternately,
(b) a first capacitor,
(c) a first diode,
(d) a switching transistor having an emitter, a collector, and a base,
(e) means connecting the emitter-collector path of one of said pair of transistors of said multivibrator circuit in series with the base of said switching transistor to gate said switching transistor "on" and "off" periodically,
(f) means connecting said first diode, said first capacitor, and the emitter-collector path of said switching transistor in series between said input terminals of said multivibrator circuit to charge said first capacitor during one portion of each cycle of operation of said multivibrator circuit when said one transistor is conducting,
(g) means connecting said first capacitor in series with the emitter-collector path of the other of said pair of transistors of said multivibrator circuit to connect said first capacitor in series with said input voltage when said other transistor is conducting during the remaining portion of each cycle of operation of said multivibrator circuit,
(h) a second capacitor,
(i) a second diode,
(j) means connecting said first and said second diodes and said second capacitor in series between said input terminals, and
(k) output terminals connected to opposite sides, respectively, of said capacitor.

4. A voltage doubler circuit comprising
(a) a multivibrator circuit having a pair of input terminals for receiving a source of operating voltage therebetween and a pair of transistors each having a base, an emitter, and a collector, said pair of transistors of said multivibrator circuit being connected to conduct alternately,
(b) a first capacitor,
(c) first unidirectional conducting means,
(d) a switching transistor having an emitter, a collector, and a base,
(e) means connecting the collector of one of said pair of transistors of said multivibrator circuit to the base of said switching transistor to gate said switching transistor "on" and "off" periodically,
(f) means connecting said first unidirectional conducting means, said first capacitor, and the emitter-collector path of said switching transistor between said input terminals of said multivibrator circuit during substantially one-half of each cycle of operation of said multivibrator circuit when said one transistor is conducting,
(g) means connecting said first capacitor to said collector of the other of said pair of transistors of said multivibrator circuit to connect said first capacitor in series with said input voltage when said other transistor is conducting during substantially the other half of each cycle of operation of said multivibrator circuit,
(h) a second capacitor,
(i) second unidirectional conducting means,
(j) means connecting said second unidirectional conducting means and said second capacitor in series between said first unidirectional conducting means and one of said input terminals, and
(k) means to derive an output voltage across said second capacitor.

5. A circuit for providing an output voltage that is greater than that of an input voltage, said circuit comprising
(a) a pair of input terminals between which said input voltage can be applied,
(b) an oscillator circuit having an input and two outputs, said oscillator circuit being adapted to provide periodic signals at said two outputs that are out of phase with each other,
(c) means connecting said input terminals to said input of said oscillator circuit,
(d) a first capacitor,
(e) a first diode,
(f) means connecting one of said input terminals to one side of said first capacitor through said first diode, said first diode being poled in a direction so that current may flow from said one terminal to said one side of said first capacitor,
(g) means connecting one of said two outputs of said oscillator circuit to the other side of said first capacitor,
(h) gated switching means,
(i) means connecting said switching means between said other side of said first capacitor and the other of said input terminals,
(j) means connecting the other of said two outputs of said oscillator circuit to said switching means to gate said switching means "on" and "off" periodically,
(k) a second capacitor,
(l) a second diode,
(m) means connecting one side of said second capacitor to said one side of said first capacitor through said second diode, said second diode being poled in a direction so that current may flow from said first capacitor to said second capacitor, and
(n) means connecting the other side of said second capacitor to said other of said input terminals, said output voltage being across said second capacitor.

6. A circuit for providing an output voltage that is substantially double that of an input voltage, said circuit comprising
(a) a pair of input terminals between which said input voltage can be applied,
(b) a multivibrator circuit having an input and two transistors each having an emitter-collector path, said transistors being connected to conduct alternately,
(c) means connecting said input terminals to said input of said multivibrator circuit,
(d) a first capacitor,
(e) a first diode,
(f) means connecting one of said input terminals to one side of said first capacitor through said first diode, said first diode being poled in a direction so that current may flow from said one terminal to said one side of said first capacitor,
(g) means connecting one of said emitter-collector paths of said two transistors in series with the other side of said first capacitor and said one input terminal,
(h) a gated switching transistor having an emitter-collector path and a base,
(i) means connecting said emitter-collector path of said switching transistor between said other side of said first capacitor and the other of said input terminals,
(j) means connecting the other of said emitter-collector paths of said two transistors in series with said base of said switching transistor to gate said switching transistor "on" and "off" periodically,
(k) a second capacitor,
(l) a second diode,
(m) means connecting one side of said second capacitor to said one side of said first capacitor through said second diode, said second diode being poled in a direction so that current may flow from said first capacitor to said second capacitor, (n) means connecting the other side of said second capacitor to said other of said input terminals, and (o) means connected to said sides of said second capacitor for obtaining said output voltage therebetween.

7. A converter circuit comprising (a) a pair of terminals for connection to a direct current source, (b) an oscillator circuit connected across said terminals to be energized by said source and comprising a first transistor having an emitter-collector path and a base layer of one conductivity type, (c) a first diode and a first capacitor, (d) means connecting said first diode, said first capacitor, said emitter-collector path and one of said terminals in a series circuit, (e) another transistor having an emitter-collector path and a base layer of opposite conductivity type to that of the first transistor and connected to said oscillator circuit to be conductive when said first transistor is cut off and to be cut off when said first transistor is conductive, said emitter-collector path of said other transistor being connected in series between said first capacitor and the other of said terminals, and (f) a second diode and a second capacitor connected in series from a point in said series circuit between said first capacitor and said first diode to said other terminal, whereby a voltage greater than that of said source may be derived across said second capacitor.

8. A converter circuit comprising (a) a pair of terminals for connection to a direct current source, (b) an oscillator circuit connected across said terminals to be energized by said source and comprising a first transistor having an emitter-collector path and a base layer of one conductivity type, (c) a first diode and a first capacitor, (d) means connecting said first diode, said first capacitor, said emitter-collector path and one of said terminals in a series circuit, (e) another transistor having an emitter-collector path and a base layer of opposite conductivity type to that of the first transistor and connected to said oscillator circuit to be conductive when said first transistor is cut off and to be cut off when said first transistor is conductive, said emitter-collector path of said other transistor being connected in series between said first capacitor and the other of said terminals, and (f) a second diode and a second capacitor connected in series from a point in said series circuit between said first capacitor and said first diode to said other terminal, whereby a voltage greater than that of said source may be derived across said second capacitor, said diodes being poled alike for current flow progressing from said one terminal toward said other terminal.

No references cited.

IRVING L. SRAGOW, *Primary Examiner.*